(12) United States Patent
Prabhu

(10) Patent No.: US 11,321,714 B2
(45) Date of Patent: May 3, 2022

(54) SYSTEM, METHOD, AND COMPUTER PROGRAM PRODUCT FOR DYNAMIC APPLICATION SELECTION

(71) Applicant: Visa International Service Association, San Francisco, CA (US)

(72) Inventor: Rajen Srinivasa Prabhu, Singapore (SG)

(73) Assignee: Visa International Service Association, San Francisco, CA (US)

( * ) Notice: Subject to any disclaimer, the term of this patent is extended or adjusted under 35 U.S.C. 154(b) by 137 days.

(21) Appl. No.: 16/641,835

(22) PCT Filed: Aug. 28, 2017

(86) PCT No.: PCT/US2017/048808
§ 371 (c)(1),
(2) Date: Feb. 25, 2020

(87) PCT Pub. No.: WO2019/045672
PCT Pub. Date: Mar. 7, 2019

(65) Prior Publication Data
US 2020/0219098 A1   Jul. 9, 2020

(51) Int. Cl.
*G06Q 30/02* (2012.01)
*G06Q 20/40* (2012.01)

(52) U.S. Cl.
CPC ....... *G06Q 20/401* (2013.01); *G06Q 30/0226* (2013.01)

(58) Field of Classification Search
CPC .. G06Q 30/02; G06Q 20/401; G06Q 30/0226; G06Q 20/326; G06Q 40/02
See application file for complete search history.

(56) References Cited

U.S. PATENT DOCUMENTS

| | | | | |
|---|---|---|---|---|
| 7,606,764 B1 * | 10/2009 | Mancini | ................. | G06Q 20/10 705/17 |
| 7,895,100 B2 * | 2/2011 | Walker | .................. | G06Q 20/10 705/35 |
| 8,484,122 B2 * | 7/2013 | Claus | ..................... | G06Q 40/00 705/37 |
| 9,070,123 B2 | 6/2015 | Theado et al. | | |

(Continued)

*Primary Examiner* — Thuy N Nguyen
(74) *Attorney, Agent, or Firm* — The Webb Law Firm

(57) ABSTRACT

A system, method, and computer program product for dynamic application selection for payment transactions determines identification data of an issuer institution associated with a portable financial device based at least partially on transaction data associated with at least one transaction at a merchant with the portable financial device. At least one electronic service application of a plurality of electronic service applications is determined based at least partially on the identification data of the issuer institution. Electronic service application data associated with the at least one electronic service application and stored in association with the issuer institution is accessed at a merchant system of the merchant. The at least one transaction is modified based at least partially on the electronic service application data associated with the at least one electronic service application. An authorization response message is received after communicating an authorization request message associated with the at least one modified transaction.

16 Claims, 6 Drawing Sheets

(56) References Cited

U.S. PATENT DOCUMENTS

| | | | |
|---|---|---|---|
| 9,665,861 B2 | 5/2017 | Fernando et al. | |
| 10,915,915 B1* | 2/2021 | Lieberman | G06Q 30/0215 |
| 2007/0011044 A1* | 1/2007 | Hansen | G06Q 20/24 |
| | | | 705/14.15 |
| 2007/0233615 A1* | 10/2007 | Tumminaro | G06Q 20/322 |
| | | | 705/75 |
| 2010/0174596 A1* | 7/2010 | Gilman | G06Q 30/0222 |
| | | | 705/14.23 |
| 2012/0197706 A1* | 8/2012 | de Boer | G06Q 30/02 |
| | | | 705/14.27 |
| 2013/0339247 A1 | 12/2013 | Lam et al. | |
| 2014/0207550 A1* | 7/2014 | Eden | G06Q 30/06 |
| | | | 705/14.23 |
| 2014/0207654 A1* | 7/2014 | Don | G06Q 20/102 |
| | | | 705/38 |
| 2014/0258088 A1* | 9/2014 | Belarj | G06Q 20/4016 |
| | | | 705/38 |
| 2015/0052036 A1 | 2/2015 | Vernal et al. | |
| 2015/0106187 A1* | 4/2015 | Berardi | G07C 9/29 |
| | | | 705/14.27 |
| 2015/0178830 A1* | 6/2015 | Zeringue | G06Q 40/025 |
| | | | 705/38 |
| 2015/0278948 A1* | 10/2015 | Don | G06Q 20/02 |
| | | | 705/38 |
| 2016/0321634 A1* | 11/2016 | George | G06Q 20/102 |
| 2016/0371661 A1* | 12/2016 | Shah | G06Q 20/401 |
| 2017/0061409 A1* | 3/2017 | Morecki | G06Q 50/01 |
| 2017/0178141 A1 | 6/2017 | Sancak et al. | |
| 2017/0243199 A1 | 8/2017 | Kalgi | |
| 2017/0270604 A1* | 9/2017 | Abela | G06Q 40/025 |
| 2017/0293927 A1* | 10/2017 | Clark | G06Q 30/0222 |
| 2017/0293931 A1* | 10/2017 | Clark | G06Q 20/3224 |
| 2018/0096335 A1* | 4/2018 | Moghaizel | G06Q 20/405 |

\* cited by examiner

SYSTEM, METHOD, AND COMPUTER PROGRAM PRODUCT FOR DYNAMIC APPLICATION SELECTION

CROSS-REFERENCE TO RELATED APPLICATION

This application is the United States national phase of International Application No. PCT/US2017/048808 filed Aug. 28, 2017, the disclosure of which is hereby incorporated by reference in its entirety.

BACKGROUND

1. Technical Field

This disclosure relates generally to conducting a payment transaction and, in some non-limiting embodiments or aspects, to a method, system, and computer program product for dynamically selecting an application for use in conducting a payment transaction.

2. Technical Considerations

Payment systems may include point of sale (POS) devices and portable financial devices to communicate and/or receive transaction data. For example, a portable financial device may communicate transaction data, such as a personal account number (PAN), to a POS device to conduct a payment transaction involving an account holder or user associated with the portable financial device and a merchant associated with the POS device.

Conventional payment systems are typically standardized and have identical behavior regardless of the portable financial device and/or account holder or user conducting the transaction. Issuer institutions and merchants cannot customize conventional POS devices to deliver unique cardholder experiences for payment transactions. For example, conventional POS devices cannot deliver value added services or applications during a payment transaction according to an issuer institution and/or merchant associated with a payment transaction. Conventional POS devices cannot initiate and/or load a dynamically selected application from an issuer system and/or an external third-party system for use in conducting a payment transaction. Instead, conventional POS devices must always use a same predetermined payment transaction process to conduct payment transactions, and users must manually present an offer or coupon at the POS for the offer or coupon to be applied to a payment transaction.

Therefore, there is a need in the art for payment systems to be able to deliver unique payment transaction experiences to account holders or users, such as value-added services or applications customized according to issuer institution and/or merchant preferences, as well as the account holder or user conducting the transaction.

SUMMARY OF THE INVENTION

Accordingly, provided are improved methods, systems, and computer program products for dynamically selecting an application for use in conducting a payment.

According to some non-limiting embodiments or aspects, provided is a computer-implemented method for dynamic application selection for payment transactions, the method comprising: determining, with at least one processor, identification data of an issuer institution associated with a portable financial device based at least partially on transaction data associated with at least one transaction at a merchant with the portable financial device; determining, with at least one processor, at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant; accessing, with at least one processor, electronic service application data of the plurality of electronic service application data associated with the at least one electronic service application and stored in association with the issuer institution at the merchant system of the merchant; modifying, with at least one processor, the at least one transaction based at least partially on the electronic service application data associated with the at least one electronic service application; communicating, with at least one processor, an authorization request message associated with the at least one modified transaction; and receiving, with at least one processor, an authorization response message after communicating the authorization request message.

According to some non-limiting embodiments or aspects, provided is a system for dynamic application selection for payment transactions, comprising at least one computer including at least one processor, the at least one computer programmed and/or configured to: determine identification data of an issuer institution associated with a portable financial device based at least partially on transaction data associated with at least one transaction at a merchant with the portable financial device; determine at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant; access electronic service application data of the plurality of electronic service application data associated with the at least one electronic service application and stored in association with the issuer institution at the merchant system of the merchant; modify the at least one transaction based at least partially on the electronic service application data associated with the at least one electronic service application; communicate an authorization request message associated with the at least one modified transaction; and receive an authorization response message after communicating the authorization request message.

According to some non-limiting embodiments or aspects, provided is a computer program product for dynamic application selection for payment transactions, the computer program product comprising at least one non-transitory computer-readable medium including program instructions that, when executed by at least one processor cause the at least one processor to: determine identification data of an issuer institution associated with a portable financial device based at least partially on transaction data associated with at least one transaction at a merchant with the portable financial device; determine at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant; access electronic service application data of the plurality of electronic service application data associated with the at least one electronic service application and stored in association with the issuer institution at the merchant system of the merchant; modify the at least one transaction based at least partially on the electronic service application data associated with the at least one electronic service application; communicate an authorization request message associated with the at least one modified transaction; and receive an authorization response message after communicating the authorization request message.

Further non-limiting embodiments or aspects are set forth in the following numbered clauses:

Clause 1. A computer-implemented method for dynamic application selection for payment transactions, the method comprising: determining, with at least one processor, identification data of an issuer institution associated with a portable financial device based at least partially on transaction data associated with at least one transaction at a merchant with the portable financial device; determining, with at least one processor, at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant; accessing, with at least one processor, electronic service application data of the plurality of electronic service application data associated with the at least one electronic service application and stored in association with the issuer institution at the merchant system of the merchant; modifying, with at least one processor, the at least one transaction based at least partially on the electronic service application data associated with the at least one electronic service application; communicating, with at least one processor, an authorization request message associated with the at least one modified transaction; and receiving, with at least one processor, an authorization response message after communicating the authorization request message.

Clause 2. The computer-implemented method of clause 1, further comprising: receiving, with at least one processor, acceptance data that indicates acceptance of the at least one electronic service application; and modifying, with at least one processor, the at least one transaction in response to the acceptance data.

Clause 3. The computer-implemented method of clauses 1 or 2, wherein the plurality of electronic service application data is stored on at least one of the following: a Point of Sale (POS) device of the merchant system, a backend system of the merchant system, or any combination thereof.

Clause 4. The computer-implemented method of any of clauses 1-3, further comprising: determining, with at least one processor, the at least one electronic service application of the plurality of electronic service applications based at least partially on at least one rule and/or identification data of the merchant.

Clause 5. The computer-implemented method of any of clauses 1-4, further comprising: associating, with at least one processor, the plurality of electronic service applications with a plurality of issuer institutions before determining the identification data of the issuer institution, wherein the at least one electronic service application is associated with the issuer institution.

Clause 6. The computer-implemented method of any of clauses 1-5, wherein the issuer institution is associated with two or more electronic service applications of the plurality of electronic service applications, the method further comprising: based at least partially on the identification data of the issuer institution, determining, with at least one processor, a subset of the two or more electronic service applications as the at least one electronic service application.

Clause 7. The computer-implemented method of any of clauses 1-6, further comprising: determining, with at least one processor, the subset of the two or more electronic service applications based at least partially on at least one of the following: a transaction amount of the at least one transaction, a transaction date and/or time of the at least one transaction, a location of the at least one transaction or merchant, a currency of the at least one transaction, a transaction data category of the at least one transaction, a type of the portable financial device, or any combination thereof.

Clause 8. The computer-implemented method of any of clauses 1-7, further comprising: determining a ranking of the plurality of electronic service applications based at least partially on at least one electronic service application ranking rule; and displaying, or causing the display of, the ranking of the plurality of electronic service applications.

Clause 9. The computer-implemented method of any of clauses 1-8, further comprising: receiving, with at least one processor, the transaction data associated with the at least one transaction at the merchant with the portable financial device, wherein the transaction data comprises portable financial device data associated with the portable financial device.

Clause 10. The computer-implemented method of any of clauses 1-9, wherein the portable financial device data comprises an account identifier.

Clause 11. The computer-implemented method of any of clauses 1-10, further comprising: communicating the portable financial device data associated with the portable financial device in response to receiving the transaction data associated with the at least one transaction; and receiving the identification data of the issuer institution after communicating the portable financial device data.

Clause 12. The computer-implemented method of any of clauses 1-11, wherein determining the at least one electronic service application comprises determining the at least one electronic service application in response to determining the identification data of the issuer institution associated with the portable financial device.

Clause 13. The computer-implemented method of any of clauses 1-12, wherein determining the identification data of the issuer institution associated with the portable financial device comprises determining a name of the issuer institution based on the portable financial device data included in the transaction data associated with the at least one transaction.

Clause 14. The computer-implemented method of any of clauses 1-13, wherein the identification data of the issuer institution comprises at least one of the following: a Bank Identification Number (BIN), a range of BINs, an Issuer Identification Number (IIN), a range of IINs, or any combination thereof.

Clause 15. The computer-implemented method of any of clauses 1-14, wherein the authorization request message includes the electronic service application data associated with the at least one electronic service application, and wherein the electronic service application data includes data associated with at least one of the following: an e-commerce marketplace application, a rewards program application associated with the portable financial device, a merchant application associated with the merchant, an issuer application associated with the issuer institution, or any combination thereof.

Clause 16. The computer-implemented method of any of clauses 1-15, wherein the authorization request message includes the electronic service application data associated with the at least one electronic service application, and wherein the electronic service application data includes data associated with at least one of the following: offer data associated with an offer for a repayment plan based on a transaction amount of the at least one transaction; offer data associated with an offer for a redemption offer for the merchant; offer data associated with an offer for a merchant loyalty program; or any combination thereof.

Clause 17. The computer-implemented method of any of clauses 1-16, wherein the authorization request message includes the electronic service application data associated with the at least one electronic service application, and wherein the electronic service application data includes data associated with at least one of the following: repayment plan data associated with a repayment plan based on a transaction amount of the at least one transaction; redemption offer data associated with a redemption offer for the merchant; program data associated with merchant loyalty program; program data associated with a reward program of the issuer institution associated with the portable financial device; or any combination thereof.

Clause 18. The computer-implemented method of any of clauses 1-17, further comprising: determining transaction amount data of the at least one transaction; determining whether the transaction amount data satisfies a threshold transaction amount value, wherein determining the at least one electronic service application of the plurality of electronic service applications comprises: determining the at least one electronic service application of the plurality of electronic service applications in response to determining that the transaction amount data satisfies the threshold transaction amount value.

Clause 19. The computer-implemented method of any of clauses 1-18, wherein the plurality of electronic service application data comprises Application Programming Interface (API) information associated with the plurality of electronic service applications, the method further comprising: initiating, or causing the initiation of, with at least one processor, at least one API call to at least one external computing system associated with the at least one electronic service application based at least partially on the electronic service application data associated with the at least one electronic service application.

Clause 20. The computer-implemented method of any of clauses 1-19, further comprising: displaying, or causing the display of, with at least one processor, at least a portion of the electronic service application data associated with the at least one electronic service application at a display device in response to determining the at least one electronic service application.

Clause 21. The computer-implemented method of any of clauses 1-20, wherein modifying the at least one transaction comprises at least one of the following: reducing a transaction amount of the at least one transaction; dividing the transaction amount of the at least one transaction into a plurality of installment amounts; automatically enrolling, or causing the enrollment of, a customer associated with the portable financial device in an incentive program, automatically transmitting, or causing the transmission of, a benefit to a user device of the customer; automatically crediting, or causing the crediting of, a merchant loyalty account of the customer; or any combination thereof.

Clause 22. The computer-implemented method of any of clauses 1-21, further comprising: conducting the at least one transaction using a cloud-based Point of Sale (POS) system.

Clause 23. A system for dynamic application selection for payment transactions, comprising at least one computer including at least one processor, the at least computer programmed and/or configured to: determine identification data of an issuer institution associated with a portable financial device based at least partially on transaction data associated with at least one transaction at a merchant with the portable financial device; determine at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant; access electronic service application data of the plurality of electronic service application data associated with the at least one electronic service application and stored in association with the issuer institution at the merchant system of the merchant; modify the at least one transaction based at least partially on the electronic service application data associated with the at least one electronic service application; communicate an authorization request message associated with the at least one modified transaction; and receive an authorization response message after communicating the authorization request message.

Clause 24. The system of clause 23, wherein the at least one computer is programmed and/or configured to receive acceptance data that indicates acceptance of the at least one electronic service application; and modify the at least one transaction in response to the acceptance data.

Clause 25. The system of clauses 23 or 24, wherein the at least one computer is programmed and/or configured to determine the at least one electronic service application of the plurality of electronic service applications based at least partially on at least one of the following: a transaction amount of the at least one transaction, a transaction date and/or time of the at least one transaction, a location of the at least one transaction or merchant, a currency of the at least one transaction, a transaction data category of the at least one transaction, a type of the portable financial device, or any combination thereof.

Clause 26. The system of any of clauses 23-25, wherein the at least one computer is programmed and/or configured to determine the at least one electronic service application of the plurality of electronic service applications based at least partially on at least one rule and/or identification data of the merchant.

Clause 27. The system of any of clauses 23-26, wherein the plurality of electronic service application data is stored on at least one of the following: a Point of Sale (POS) device of the merchant, a backend system of the merchant, or any combination thereof.

Clause 28. The system of any of clauses 23-27, wherein the issuer institution is associated with two or more electronic service applications of the plurality of electronic service applications, and wherein the at least one computer is programmed and/or configured to determine a subset of the two or more electronic service applications as the at least one electronic service application based at least partially on the identification data of the issuer institution.

Clause 29. The system of any of clauses 23-28, wherein the at least one computer is programmed and/or configured to determine the subset of the two or more electronic service applications based at least partially on at least one of the following: a transaction amount of the at least one transaction, a transaction date and/or time of the at least one transaction, a location of the at least one transaction or merchant, a currency of the at least one transaction, a transaction data category of the at least one transaction, a type of the portable financial device, or any combination thereof.

Clause 30. The system of any of clauses 23-29, wherein the at least one computer is programmed and/or configured to: determine a ranking of the plurality of electronic service applications based at least partially on at least one electronic service application ranking rule; and display, or cause the display of, the ranking of the plurality of electronic service applications.

Clause 31. The system of any of clauses 23-30, wherein the at least one computer is programmed and/or configured to receive the transaction data associated with the at least one transaction at the merchant with the portable financial device, wherein the transaction data comprises portable financial device data associated with the portable financial device.

Clause 32. The system of any of clauses 23-31, wherein the portable financial device data comprises an account identifier.

Clause 33. The system of any of clauses 23-32, wherein the at least one computer is programmed and/or configured to: communicate the portable financial device data associated in response to receiving the transaction data associated with the at least one transaction; and receive the identification data of the issuer institution after communicating the portable financial device data.

Clause 34. The system of any of clauses 23-33, wherein the at least one computer is programmed and/or configured to determine the at least one electronic service application in response to determination of the identification data of the issuer institution associated with the portable financial device.

Clause 35. The system of any of clauses 23-34, wherein the at least one computer is programmed and/or configured to determine a name of the issuer institution based on the portable financial device data included in the transaction data associated with the at least one transaction.

Clause 36. The system of any of clauses 23-35, wherein the identification data of the issuer institution comprises at least one of the following: a Bank Identification Number (BIN), a range of BINs, an Issuer Identification Number (IIN), a range of IINs, or any combination thereof.

Clause 37. The system of any of clauses 23-36, wherein the authorization request message includes the electronic service application data associated with the at least one electronic service application, and wherein the electronic service application data includes data associated with at least one of the following: an e-commerce marketplace application, a rewards program application associated with the portable financial device, a merchant application associated with the merchant, an issuer application associated with the issuer institution, or any combination thereof.

Clause 38. The system of any of clauses 23-37, wherein the authorization request message includes the electronic service application data associated with the at least one electronic service application, and wherein the electronic service application data includes data associated with at least one of the following: offer data associated with an offer for a repayment plan based on a transaction amount of the at least one transaction; offer data associated with an offer for a redemption offer for the merchant; offer data associated with an offer for a merchant loyalty program; or any combination thereof.

Clause 39. The system of any of clauses 23-38, wherein the authorization request message includes the electronic service application data associated with the at least one electronic service application, and wherein the electronic service application data includes data associated with at least one of the following: repayment plan data associated with a repayment plan based on a transaction amount of the at least one transaction; redemption offer data associated with a redemption offer for the merchant; program data associated with merchant loyalty program; program data associated with a reward program of the issuer institution associated with the portable financial device; or any combination thereof.

Clause 40. The system of any of clauses 23-39, wherein the at least one computer is programmed and/or configured to: determine transaction amount data of the at least one transaction; determine whether the transaction amount data satisfies a threshold transaction amount value; and determine the at least one electronic service application of the plurality of electronic service applications in response to a determination that the transaction amount data satisfies the threshold transaction amount value.

Clause 41. The system of any of clauses 23-40, wherein the electronic service application data comprises Application Programming Interface (API) information associated with the plurality of electronic service applications, and wherein the at least one computer is programmed and/or configured to: initiate, or causing the initiation of, at least one API call to at least one external computing system associated with the at least one electronic service application based at least partially on the electronic service application data associated with the at least one electronic service application.

Clause 42. The system of any of clauses 23-41, wherein the at least one computer is programmed and/or configured to display, or cause the display of, at least a portion of the electronic service application data associated with the at least one electronic service application at a display device in response to determining the at least one electronic service application.

Clause 43. The system of any of clauses 23-42, wherein the at least one computer comprises a cloud-based Point of Sale (POS) system.

Clause 44. A computer program product for dynamic application selection for payment transactions, the computer program product comprising at least one non-transitory computer-readable medium including program instructions that, when executed by at least one processor cause the at least one processor to: determine identification data of an issuer institution associated with a portable financial device based at least partially on transaction data associated with at least one transaction at a merchant with the portable financial device; determine at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant; access electronic service application data of the plurality of electronic service application data associated with the at least one electronic service application and stored in association with the issuer institution at the merchant system of the merchant; modify the at least one transaction based at least partially on the electronic service application data associated with the at least one electronic service application; communicate an authorization request message associated with the at least one modified transaction; and receive an authorization response message after communicating the authorization request message.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
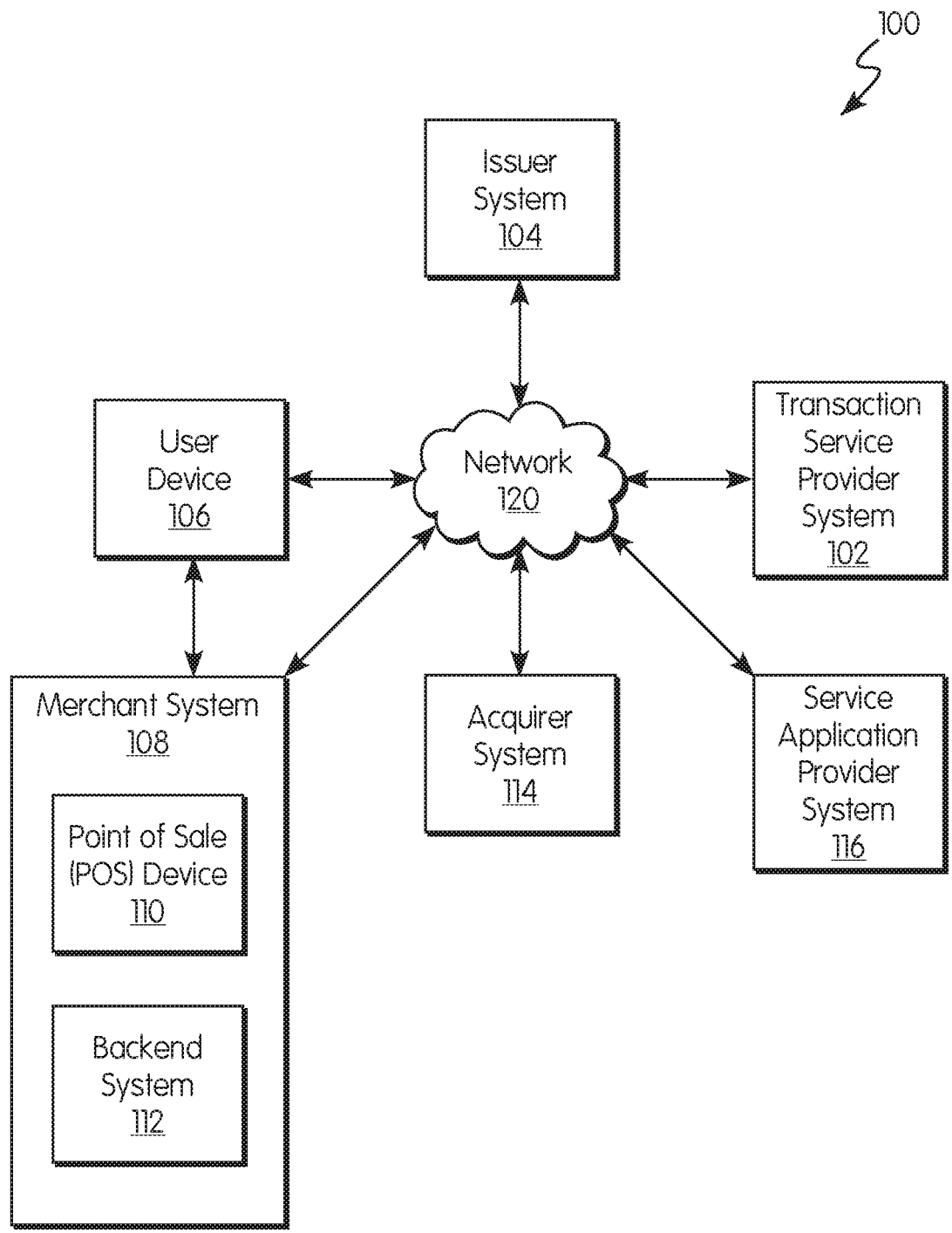
FIG. 1 is a diagram of some non-limiting embodiments or aspects of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitator, and/or the like. In some non-limiting embodiments, an acquirer may be a financial institution, such as a bank.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "computing device" may refer to one or more electronic devices that are configured to directly or indirectly communicate with or over one or more networks. The computing device may be a mobile device. As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, tablet computers, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the term "application" or "application program interface" (API) refers to computer code, a set of rules, or other data sorted on a computer-readable medium that may be executed by a processor to facilitate interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "electronic service application" refers to any application or API that may be executed by a processor to facilitate conducting or processing a payment transaction.

Non-limiting embodiments or aspects of the present disclosure are directed to systems, methods, and computer program products for dynamically selecting an electronic service application for use in conducting or processing a payment transaction. Non-limiting embodiments or aspects of the present disclosure allow for initiating and/or loading a dynamically selected application from an issuer system and/or an external third-party system for use in conducting a payment transaction at a merchant POS device. These features enable a POS device to deliver value added services or applications and unique payment transaction experiences to customers during a payment transaction according to preferences of an issuer institution associated with a payment transaction. For example, a transaction can be modified during conducting or processing of the transaction according to an electronic service application that was dynamically selected based on transaction data of the transaction. This enables a merchant or acquirer to uniquely configure transaction processing according to an issuer institution associated with the transaction before completing the transaction. These features also enable a transaction to be modified, for example, with an offer or coupon, without requiring a user to manually present the offer or coupon at the POS for the offer or coupon to be applied to a payment transaction.

Non-limiting embodiments or aspects of the present disclosure may include a computer-implemented method that comprises issuing at least one API call to at least one remote or external computing system associated with the at least one electronic service application. In this way, processor and network resources may be reduced as compared to conventional POS devices. These features further enable POS devices that provide customized transaction experiences when compared to conventional POS devices that are standardized and have identical behavior regardless of the portable financial device and/or account holder or user conducting the transaction. Moreover, a an offer or coupon associated with a third party other than the merchant system can still be applied to a payment transaction even if a user does not manually present the offer or coupon at the POS by issuing an API call to a remote or external computing system associated with the third party and providing at least one electronic service application that can be used to apply the offer or coupon to the payment transaction.

Referring to FIG. 1, some non-limiting embodiments or aspects of an environment 100 in which systems, devices, products, apparatus, and/or methods, as described herein, may be implemented is shown. As shown in FIG. 1, environment 100 may include transaction service provider system 102, issuer system 104, user device 106, merchant system 108, acquirer system 114, service application provider system 116, and network 120. As further shown in FIG. 1, merchant system 108 may include point-of-sale (POS) device 110 and backend system 112.

Transaction service provider system 102 may include one or more devices capable of receiving information from and/or communicating information to issuer system 104, user device 106, merchant system 108, acquirer system 114, and/or service application provider system 116, via network 120. For example, transaction service provider system 102 may include one or more computing devices, a server, a group of servers, and/or the like. In some non-limiting embodiments or aspects, transaction service provider system 102 may be associated with an entity (e.g., a transaction service provider) that operates a credit card network and that processes payments for credit accounts, debit accounts, credit cards, debit cards, and/or the like.

Issuer system 104 may include one or more devices capable of receiving information from and/or communicating information to transaction service provider system 102, user device 106, merchant system 108, acquirer system 114, and/or service application provider system 116, via network 120. For example, issuer system 104 may include one or more computing devices, a server, a group of servers, and/or the like. In some non-limiting embodiments or aspects, the issuer system 104 may be associated with an issuer institution as described herein. In some non-limiting embodiments or aspects, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, merchant system 108, acquirer system 114, and/or service application provider system 116, via network 120. For example, user device 106 may include a client device, a computer device, a desktop computer, a mobile device, and/or the like. In some non-limiting embodiments or aspects, a mobile device may include one or more portable electronic devices configured to communicate with one or more other electronic devices via a network (e.g., network 120). For example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. In some non-limiting embodiments or aspects, user device 106 may be capable of receiving information (e.g., from merchant system 108) via a short range wireless communication connection (e.g., an NFC communication connection, a Radio-frequency identification (RFID) communication connection, a Bluetooth® communication connection, and/or the like), and/or communicating information (e.g., to merchant system 108) via a short range wireless communication connection.

Merchant system 108 may include one or more devices capable of receiving information from and/or communicating information to transaction service provider system 102, issuer system 104, user device 106, acquirer system 114, and/or service application provider system 116, via network 120. For example, merchant system 108 may include a computing device, a server, a group of servers, a client device, a group of client devices and/or the like. In some non-limiting embodiments or aspects, merchant system 108 may be associated with a merchant as described herein. In some non-limiting embodiments or aspects, merchant system 108 may include one or more user devices 106. For example, merchant system 108 may include user device 106 that allows a merchant associated with merchant system 108 to receive information from and/or communicate information to transaction service provider system 102, issuer system 104, user device 106, acquirer system 114, and/or service application provider system 116, via network 120.

In some non-limiting embodiments or aspects, merchant system 108 may be capable of being used by a merchant to initiate, engage in, and/or conduct a payment transaction with a user (e.g., a customer, a consumer, and/or the like), which may be associated with user device 106. For example, merchant system 108 may include one or more computers, servers, input devices, payment terminals, magnetic stripe card readers, chip card readers, contactless transceivers, contactless receivers, NFC receivers, RFID receivers, contact-based receivers, and/or other and/or the like. In some non-limiting embodiments or aspects, merchant system 108 may include a device capable of receiving information from user device 106 via a short range wireless communication connection (e.g., a communication connection that uses NFC protocol, a communication connection that uses Radio-frequency identification (RFID), a communication connection that uses a Bluetooth® wireless technology standard, and/or the like), and/or communicating information to user device 106 via a short range wireless communication connection.

Merchant system 108 may include POS device 110 and backend system 112. In some non-limiting embodiments or aspects, POS device 110 may include a POS terminal (e.g., a POS terminal located at a location of a merchant) and/or an electronic device that performs the functions of a POS terminal. In some non-limiting embodiments or aspects, backend system 112 may include a computing device, a server, a group of servers, and/or the like. In some non-limiting embodiments or aspects, POS device 110 and/or backend system 112 may be capable of receiving information from and/or communicating information to transaction service provider system 102, issuer system 104, user device 106, acquirer system 114, and/or service application provider system 116, via network 120. In some non-limiting embodiments or aspects, POS device 110 and backend system 112 may be capable of receiving information from and/or communicating information to each other. For example, POS device 110 and backend system 112 may be capable of receiving information from and/or communicating information to each other via a network (e.g., network 120). In some non-limiting embodiments or aspects, backend system 112 may be separate from merchant system 108. For example, backend system 112 may be associated with transaction service provider system 102, issuer system 104, acquirer system 114, and/or service application provider system 116, and/or backend system 112 may include a cloud-based POS system.

Acquirer system 114 may include one or more devices capable of receiving information from and/or communicating information to transaction service provider system 102, issuer system 104, user device 106, merchant system 108, and/or service application provider system 116, via network 120. For example, acquirer system 114 may include a computing device, a server, a group of servers, and/or the like. In some non-limiting embodiments or aspects, acquirer system 114 may be associated with an acquirer as described herein.

Service application provider system 116 may include one or more systems that include one or more devices capable of receiving information from and/or communicating information to transaction service provider system 102, issuer system 104, user device 106, merchant system 108, acquirer system 114, via network 120. For example, service application provider system 116 may include one or more computing devices, a server, a group of servers, and/or the like. In some non-limiting embodiments or aspects, service application provider system 116 may be associated with an entity that provides one or more programs, such as e-commerce marketplace programs, discount programs, financing programs, incentive programs, coupon programs, rewards programs, and the like, that can be used in conducting or processing a payment transaction. For example, a service application provider may be an entity, such as Groupon, and provide one or more electronic service applications via service application provider system 116 to merchant system 108 for use in conducting or processing a payment transaction as described herein. In some non-limiting embodiments or aspects, service application provider system 116 may comprise transaction service provider system 102, issuer system 104, merchant system 108, acquirer system 114, an electronic wallet provider system associated with an electronic wallet provider as described herein, and/or a payment gateway system associated with a payment gateway as described herein, that provides one or more electronic service applications via service application provider system 116 to merchant system 108 for use in conducting or processing a payment transaction as described herein.

Network 120 may include one or more wired and/or wireless networks. For example, network 120 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of environment 100 may perform one or more functions described as being performed by another set of systems or another set of devices of environment 100. For example, transaction service provider system 102, issuer system 104, user device 106, acquirer system 114, service application provider system 116, an electronic wallet provider system, and/or a payment gateway system may be capable of being used to initiate, engage in, and/or conduct a payment transaction with a user (e.g., a customer, a consumer, and/or the like), as described herein with respect to merchant system 108.

A customer or user may be a holder of a portable financial device (e.g., an account holder) and use that portable financial device associated with a transaction service provider and issued by an issuer which may have issuer system 104 operated by or on behalf of the issuer. The customer or user may use the portable financial device to initiate transactions with merchant system 108 having POS device 110. In some non-limiting embodiments or aspects, the customer or user may purchase goods or services from the merchant using the portable financial device and the merchant system 108 to guarantee payment of the goods or services.

The merchant system 108 may communicate with the transaction service provider system 102 to initiate further processing of a transaction between the merchant system 108 and the customer or user. This may be in the form of a transaction authorization request to request further processing of a transaction initiated with the portable financial device. The merchant system 108 may communicate transaction data to the transaction service provider system 102. The transaction data may include transaction parameters associated with transactions initiated with the portable financial device of the customer or user. Non-limiting examples of transaction parameters include: primary account number (PAN), Bank Identification Number (BIN), a range of BINs, Issuer Identification Number (IIN), a range of IINs, transaction amount, transaction date and time, conversion rate of currency, merchant type, acquiring institution country, PAN country, response code, merchant name/location, type of currency, and the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and the like. Other relevant response codes from the credit card issuer response codes may be included as the response code, where relevant. Further, it will be appreciated that these transaction parameters associated with transactions of the user may be communicated to the transaction service provider system 102, and may be stored in a transaction service provider database, for example, as transaction data in association with the customer or user.

In some non-limiting embodiments or aspects, the transaction data may include the following transaction data categories: travel and entertainment transactions, retail transactions, dining transactions, "everyday" spending transactions, or any combination thereof. For example, the transaction data may define for a customer or user proportions of transactions in travel and entertainment transactions, retail transactions, dining transactions, and everyday spending transactions. Travel and entertainment category transactions may include transactions related to airlines, lodging, vehicle rental, entertainment and travel services, and the like. Retail category transactions may include transactions related to apparel and accessories, department stores, discount stores, general retail goods, electronics and home improvement stores, and the like. Dining category transactions may include transactions related to restaurants and quick service restaurants, and the like. Everyday spending category transactions may include transactions related to food and groceries, fuel, transportation, drugstores and pharmacies, and the like. Travel and entertainment transactions, retail transactions, and dining transactions may be defined as discretionary spending. Everyday spending transactions may be defined as non-discretionary spending. Any other metric may be included that is determined to be relevant for defining the purchasing or spending behavior of an account holder or user 100. In some non-limiting embodiments or aspects, the transaction data may include more narrowly defined transaction data categories, such as transaction data categories defined based at least partially on Merchant Category Classification (MCC) codes. MCC is used to classify a merchant by the type of goods or services the merchant provides. MCC codes can be assigned by merchant type, (e.g., one for hotels, one for office supply stores, one for coffee merchants, etc.), or by merchant name (e.g., 3000 for United Airlines).

Figure 2:
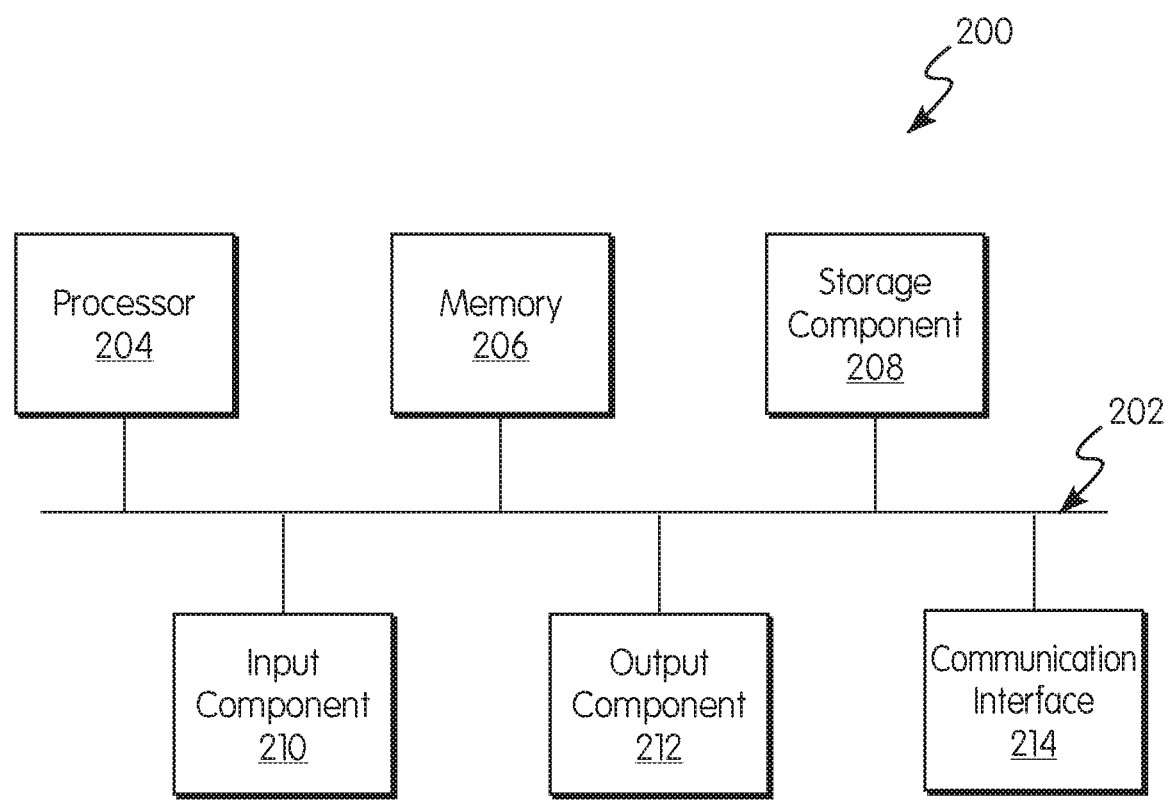
FIG. 2 is a diagram of some non-limiting embodiments or aspects of components of one or more devices of FIG. 1.

Referring now to FIG. 2, FIG. 2 is a diagram of example components of a device 200. Device 200 may correspond to transaction service provider system 102, issuer system 104, user device 106, merchant system 108, POS device 110, backend system 112, acquirer system 114, service application provider system 116, and/or one or more devices of transaction service provider system 102, issuer system 104, user device 106, merchant system 108, backend system 112, acquirer system 114, and/or service application provider system 116. In some non-limiting embodiments or aspects, transaction service provider system 102, issuer system 104, user device 106, merchant system 108, POS device 110, backend system 112, acquirer system 114, and/or service application provider system 116, may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.), and/or the like, which can be programmed to perform a function. Memory 206 may include a random-access memory (RAM), a read only memory (ROM), and/or another type of dynamic or static storage device (e.g., a flash memory, a magnetic memory, an optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
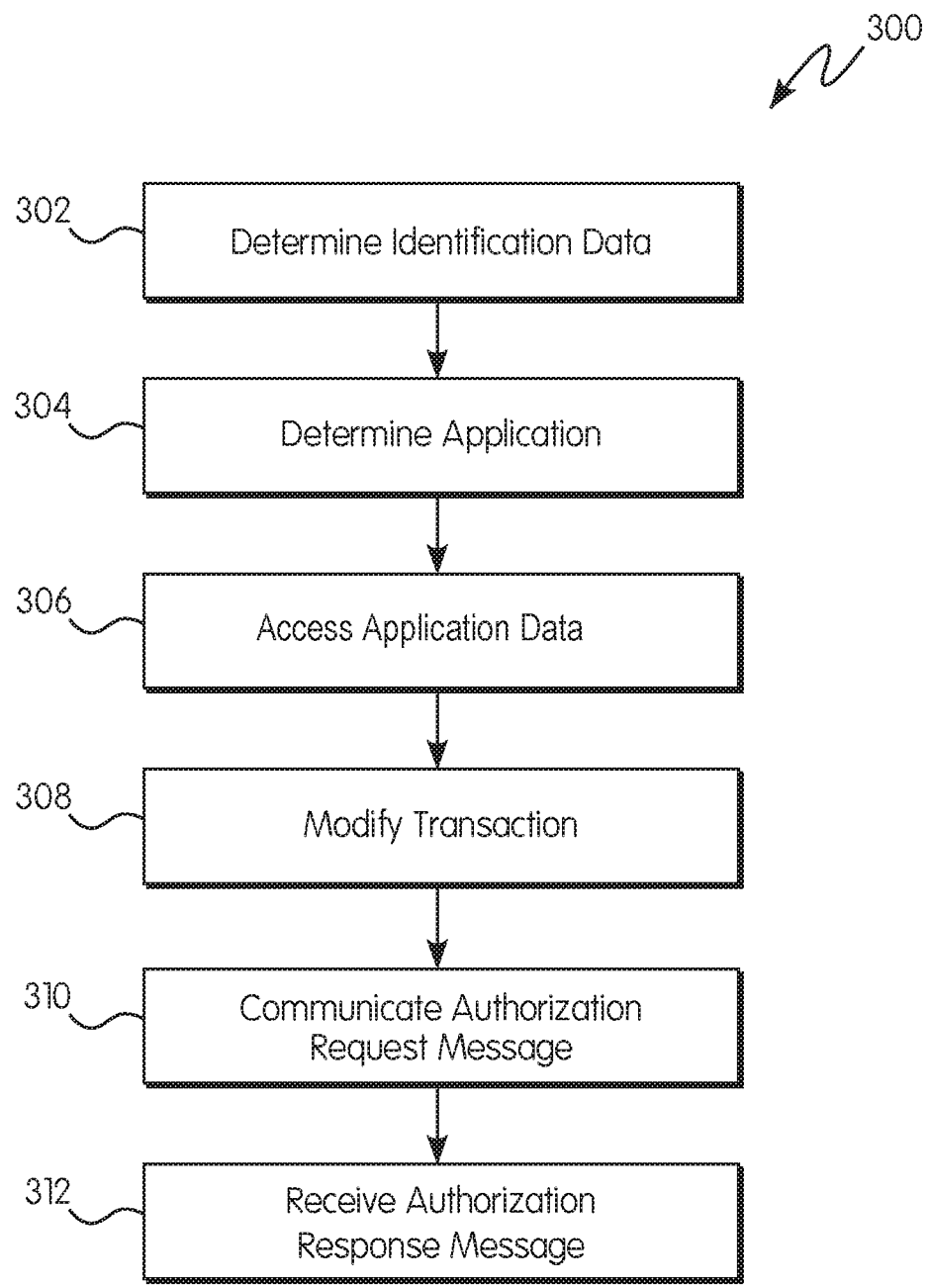
FIG. 3 is a flowchart of some non-limiting embodiments or aspects of a process for dynamic application selection for payment transactions according to the principles of the present disclosure.

Referring now to FIG. 3, a process 300 is shown for dynamic application selection for payment transactions. In some non-limiting embodiments or aspects, one or more of the steps of process 300 may be performed (e.g., completely, partially, etc.) by merchant system 108 including POS device 110 and/or backend system 112. In some non-limiting embodiments or aspects, one or more of the steps of process 300 may be performed (e.g., completely, partially, etc.) by another system, another device, another group of systems, or another group of devices, separate from or including merchant system 108, such as transaction service provider system 102 (e.g., one or more devices of transaction service provider system 102), issuer system 104 (e.g., one or more devices of issuer system 104), user device 106, merchant system 108 (e.g., one or more devices of merchant system 108), acquirer system 114 (e.g., one or more devices of acquirer system 114), and/or service application provider system 116 (e.g., one or more devices of service application provider system 116). In some non-limiting embodiments or aspects, one or more of the steps of process 300 may be performed (e.g., completely, partially, etc.) by POS device 110, which may be a computing device, such as a tablet computer, that executes cloud-based POS software, such as Poynt, ThumbzUp, and the like, that provide a merchant interface on POS device 110 and deliver cloud-based APIs to the POS device 110.

As shown in FIG. 3, process 300 includes a step 302 of determining, with at least one processor, identification data of an issuer institution associated with a portable financial device based at least partially on transaction data associated with at least one transaction at a merchant with the portable financial device. At a step 304, at least one processor determines at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant. At a step 306, at least one processor accesses electronic service application data of the plurality of electronic service application data associated with the at least one electronic service application and stored in association with the issuer institution at the merchant system of the merchant. At a step 308, at least one processor modifies the at least one transaction based at least partially on the electronic service application data associated with the at least one electronic service application. At a step 310, at least one processor communicates an authorization request message associated with the at least one modified transaction. At a step 312, at least one processor receives an authorization response message after communicating the authorization request message.

With continued reference to FIG. 3, step 302 may include receiving, with at least one processor, the transaction data associated with the at least one transaction at the merchant with the portable financial device, wherein the transaction data comprises portable financial device data associated with the portable financial device. For example, a customer or user initiates a financial transaction using a portable financial device associated with a transaction service provider and an issuer institution. The transaction may be a financial transaction with merchant system 108. The customer or user provides portable financial device data from his/her portable financial device to the merchant system 108 to conduct or complete a financial transaction in exchange for goods or services offered by the identified merchant. For example, POS device 110 of merchant system 108 may receive the portable financial device data from the portable financial device of the customer or user, (e.g., from a credit card, a debit card, a mobile device 106, etc. of the customer or user that provides the portable financial device data to the POS device 110). In some non-limiting embodiments or aspects, the transaction can be conducted or processed using a cloud-based POS system. For example, the POS device 110 may comprise a user device 106 or other computing device, such as a mobile device or tablet computer, that transmits the portable financial device data to a remote server or system that conducts or processes the transaction remotely from the POS device 110. The portable financial device data can include an account identifier, (e.g., 16-digit PAN), a Bank Identification Number (BIN), a range of BINs, an Issuer Identification Number (IIN), a range of IINs, or any combination thereof. However, the portable financial device data is not limited thereto and may include any data associated with the portable financial device and/or account holder or user of the portable financial device.

In some non-limiting embodiments or aspects, the identification data of the issuer institution comprises at least one of the following: a Bank Identification Number (BIN), a range of BINs, an Issuer Identification Number (IIN), a range of IINs, or any combination thereof. In step 302, determining the identification data of the issuer institution associated with the portable financial device of the customer may comprise determining a name of the issuer institution based on the portable financial device data included in the transaction data associated with the at least one transaction. For example, the merchant system 108 can determine the identification data of the issuer institution by identifying a PAN, BIN, IIN, a range of BINs, and/or a range of IINs, in the portable financial device data, and determine the issuer institution associated with that PAN, BIN, IIN, range of BINS, or range of IINs. In some non-limiting embodiments or aspects, the merchant system 108 can access a look-up table that associates known issuer institutions with PANs, BINs, IINs, ranges of BINs, and/or ranges of IINs, to determine the issuer institution. In some non-limiting embodiments or aspects, at least one processor, in response to receiving the transaction data associated with the at least one transaction, can communicate the portable financial device data associated with the customer, and receive the identification data of the issuer institution after communicating the portable financial device data. For example, the merchant system 108 can communicate the portable financial device data to the transaction service provider system 102 and/or the issuer system 104, and receive from the transaction service provider system 102 and/or the issuer system 104 the identification data, such as a name of the issuer institution associated with a PAN, BIN, IIN, a range of BINs, and/or a range of IINs included in the portable financial device data.

With continued reference to FIG. 3, step 304 may include associating, with at least one processor, the plurality of electronic service applications with a plurality of issuer institutions before determining the identification data of the issuer institution, wherein the at least one electronic service application is associated with the issuer institution. For example, the merchant system 108 can store and/or access the identification data of the plurality of issuer institutions in association with one or more of the plurality of electronic service applications at POS device 110, backend system 112, a merchant system database, and/or a remote system, such as a cloud-based POS system server, transaction service provider system 102, issuer system 104, acquirer system 114, and/or service application provider system 116. In some non-limiting embodiments or aspects, an issuer institution can be associated with two or more electronic service applications of the plurality of electronic service applications.

In some non-limiting embodiments or aspects, merchant system 108 can store and/or access the plurality of electronic service applications and/or electronic service application data associated with the plurality of electronic service applications with at least one of the following: POS device 110, backend system 112, a merchant system database, a remote system, such as a cloud-based POS system server, transaction service provider system 102, issuer system 104, acquirer system 114, and/or service application provider system 116, or any combination thereof. In some non-limiting embodiments or aspects, the at least one electronic service application may be cloud-based, for example, accessed over the network 120 by the merchant system 108 at backend system 112, transaction service provider system 102, issuer system 104, acquirer system 114, and/or service application provider system 116. For example, the merchant system 108 may store in a memory electronic service application data associated with the plurality of electronic service applications, wherein the electronic service application data comprises Application Programming Interface (API) information associated with each of the plurality of electronic service applications, and initiate, or cause the initiation of, at least one API call to at least one remote or external computing system associated with the at least one electronic service application based at least partially on the electronic service application data. POS device 110 may initiate an API call to backend system 112, transaction service provider system 102, issuer system 104, acquirer system 114, or service application provider system 116, and backend system 112, transaction service provider system 102, issuer system 104 acquirer system 114, or service application provider system 116 may provide access to the electronic service application and/or electronic service application data associated with the electronic service application, such as interfaces, user prompts, and/or results of processing the at least one transaction with the electronic service application at the remote or external computing system, to the POS device 110 in response to the API call. The POS device 110 may be a computing device, such as a tablet computer, that executes cloud-based POS software, such as Poynt, ThumbzUp, and the like, that provide a merchant interface on the POS device 110 and deliver cloud-based APIs to the POS device 110. In some non-limiting embodiments or aspects, the merchant system 108 may store in a local memory, such as on POS device 110, all or a portion of the plurality of electronic service applications. For example, the merchant system 108 may store all or a portion of the electronic service application data associated with the at least one electronic service application and process the at least one transaction locally with the at least one electronic service application.

With continued reference to FIG. 3, step 304 may include determining the at least one electronic service application in response to determining the identification data of the issuer institution associated with the portable financial device of the customer. For example, the merchant system 108 can determine the issuer institution associated with the PAN, BIN, IIN, range of BINs, range of IINs, and/or issuer institution name determined from the transaction data, and determine at least one electronic service application that is associated with the determined issuer institution. In some non-limiting embodiments or aspects, the merchant system 108 can access a look-up table that associates the plurality of electronic service applications and/or electronic service application data associated therewith with known issuer institutions, and select at least one electronic service application that is associated with the determined issuer institution in the look-up table for use in conducting or processing the at least one transaction.

In some non-limiting embodiments or aspects, the at least one electronic service application of the plurality of electronic service applications is determined based at least partially on at least one of the following: the transaction data, identification data of the issuer institution, identification data of the merchant, at least one rule, or any combination thereof. For example, the merchant system 108 can determine at least one electronic service application that is associated with the determined issuer institution and a merchant associated with the merchant system 108 for use in conducting or processing the transaction. In some non-limiting embodiments or aspects, the merchant system 108 may not determine at least one electronic service application or determine a default electronic service application for use in conducting or processing the transaction if there is no electronic service application of the plurality of electronic service applications associated with the determined issuer institution and the merchant associated with the merchant system 108. For example, a merchant may choose to configure a POS device 110 to determine electronic service applications for use in conducting or processing transactions associated with portable financial devices of certain issuer institutions, while using default or standard transaction processing, e.g., transaction processing that does not modify the transaction, to conduct transactions associated with portable financial devices of other issuer institutions.

In some non-limiting embodiments or aspects, at least one electronic service application of the plurality of electronic service applications may be associated with at least one rule, and the merchant system 108 can determine an electronic service application that is associated with the determined issuer institution as the at least one electronic service application for use in conducting or processing the at least one transaction if transaction data associated with the at least one transaction satisfies the at least one rule associated with that electronic service application. The at least one rule may define at least one of the following requirements with respect to a transaction for an electronic service application to be determined for use in conducting or processing the transaction: transaction amount, transaction date and/or time, transaction or merchant location, transaction currency, transaction data category, type of portable financial device, or any combination thereof. For example, the merchant system 108 may determine transaction amount data of the at least one transaction, determine whether the transaction amount data satisfies a threshold transaction amount value, and determine the at least one electronic service application of the plurality of electronic service applications in response to determining that the transaction amount data satisfies the threshold transaction amount value. For example, an electronic service application that modifies a transaction by reducing a required or requested payment amount for completing the transaction, or that offers to divide the required or requested payment into multiple installment payments, may only be used in conducting or processing a transaction if an original required or requested amount for completing the transaction is above a threshold amount, such as an amount over $1000.

In some non-limiting embodiments or aspects, if the at least one rule is not satisfied, e.g., if a transaction amount does not meet or exceed a threshold transaction amount, the merchant system 108 may conduct or process the transaction without determining an electronic service application for use in the transaction, or determine a default or standard electronic service application for use in the transaction, e.g., standard processing by the POS device 110 that attempts to authorize the transaction with the transaction service provider system 102 and/or the issuer system 104 without modifying the transaction with an electronic service application.

In some non-limiting embodiments or aspects, an issuer institution can be associated with two or more electronic service applications of the plurality of electronic service applications, and at least one processor can determine, based at least partially on one of the following: the transaction data, the identification data of the issuer institution, the identification data of the merchant, the at least one rule, or any combination thereof, a subset of the two or more electronic service applications as the at least one electronic service application. For example, the two or more electronic service applications may include two or more of the following: one or more repayment plans based on a transaction amount of the at least one transaction; one or more redemption offers for the merchant; one or more merchant loyalty programs; one or more reward programs of the issuer institution associated with the portable financial device; or any combination thereof. The merchant system 108 may select a subset, such as an electronic service application that provides a largest discount of two or more electronic service applications that provide redemption offers for the merchant, of the two or more electronic service applications for use in conducting or processing the payment transaction. For example, the merchant system 108 may determine a ranking of the two or more electronic service applications based at least partially on at least one electronic service application ranking rule, e.g., the merchant system 108 may determine ranking of the two or more electronic service applications according to a discount available from each of the two or more electronic service applications, such as a ranking from a largest discount to a smallest discount that can be applied to the at least one transaction, and automatically select the at least one electronic service application based on the ranking, e.g., select an electronic service application of the two or more electronic service applications that provides the greatest discount. However, non-limiting embodiments or aspects are not limited thereto and two or more electronic service applications associated with the same issuer institution can be ranked according to any one or more of the parameters of the transaction data associated with the at least one transaction.

With continued reference to FIG. 3, step 306 may include displaying, or causing the display of, with at least one processor, at least a portion of the electronic service application data associated with the at least one electronic service application at a display device in response to determining the at least one electronic service application. For example, the POS device 110 of the merchant system 108, or the user device 106, may display to a customer or user an interface or prompt that requests authorization from the customer or user to conduct or process the at least one transaction with the at least one electronic service application determined based on the identification data of the issuer institution. The interface or prompt may include electronic service application data that explains an effect of conducting or processing the at least one transaction with the electronic service application, such as a modification of the at least one transaction or a target action that will be initiated with respect to the customer or user. The customer or user can input their authorization to the POS device 110, either directly or via user device 106, as acceptance data to indicate acceptance of the at least one electronic service application. In some non-limiting embodiments or aspects, the POS device 110 may request that the customer or user select the at least one electronic service application from the two or more electronic service applications. For example, the customer or user may be presented with an option in the interface or prompt displayed by the POS device 110 to choose between two or more different incentive programs to use in conducting or processing the at least one transaction.

In some non-limiting embodiments or aspects, the merchant system 108 may determine a ranking of the plurality of electronic service applications based at least partially on at least one electronic service application ranking rule and display, or cause the display of, the ranking of the plurality of electronic service applications. For example, the POS device 110 may display a list ranking available discounts, e.g., from a largest discount to a smallest discount, that can be applied to the at least one transaction, and the customer or user can select via the POS device 110 the available discount and corresponding electronic service application that the customer or user wants to be used to conduct or process the at least one transaction, (e.g., the acceptance data may indicate an acceptance of a specific electronic service application(s) of the plurality of electronic service applications). In some no limiting embodiments or aspect, the POS device 110 can automatically select the at least one electronic service application based on the ranking of the plurality of electronic service application. For example, the POS device 110 can automatically select a highest ranked electronic service application, (e.g., that provides a largest discount), and apply that electronic service application to the at least one transaction in response to acceptance data indicating acceptance of the automatically selected electronic service application by the customer or user.

With continued reference to FIG. 3, step 308 may include in response to the acceptance data, modifying, with at least one processor, the transaction data associated with the at least one transaction based at least partially on the electronic service application data associated with the at least one electronic service application. An electronic service application may include one or more rules or functions that can be applied to the at least one transaction to modify the at least one transaction. The merchant system 108 may apply one or more rules defined by electronic service application data associated with the at least one electronic service application to the transaction data of the at least one transaction to modify the at least one transaction and/or the transaction data associated therewith. The electronic service application data may include data associated with at least one of the following: an e-commerce marketplace application, a rewards program application associated with the portable financial device, a merchant application associated with the merchant, an issuer application associated with the issuer institution, or any combination thereof. For example, the electronic service application data may include data associated with at least one of the following: offer data associated with an offer for a repayment plan based on a transaction amount of the at least one transaction; offer data associated with an offer for a redemption offer for the merchant; offer data associated with an offer for a merchant loyalty program; or any combination thereof. In some non-limiting embodiments or aspects, the electronic service application data includes data associated with at least one of the following: repayment plan data associated with a repayment plan based on a transaction amount of the at least one transaction; redemption offer data associated with a redemption offer for the merchant; program data associated with merchant loyalty program; program data associated with a reward program of the issuer institution associated with the portable financial device; or any combination thereof.

In some non-limiting embodiments or aspects, an electronic service application can be applied to the at least one transaction to apply a coupon to the at least one transaction. For example, merchant system 108 can automatically process the at least one transaction based at least partially on at least one coupon associated with service application provider system 116 that provides the electronic service application, (e.g., an electronic coupon from Groupon), and redeem the at least one coupon in association with the at least one transaction to modify the transaction data associated with the at least one transaction, e.g., to modify a transaction amount of the at least one transaction.

In some non-limiting embodiments or aspects, an electronic service application can be applied to the at least one transaction to reduce a transaction amount required or requested for completing the transaction. A transaction amount of the at least one transaction may be reduced by a percentage amount based at least partially on an electronic service application used to conduct or process the transaction. For example, if merchant system 108 determines that a credit card associated with the at least one transaction has an BIN associated with an issuer institution that provides an electronic service application that provides a discount to cardholders for using their card at that merchant, the merchant system 108 can discount the at least one transaction by applying the electronic service application to the at least one transaction.

In some non-limiting embodiments or aspects, an electronic service application can be applied to the at least one transaction to split a transaction amount for the at least one transaction into a plurality of installments or a payment plan, e.g., an initial payment and one or more later payments, such as at 3, 6, and 9 months from the date of the initial payment or initiation of the transaction. The electronic service application can automatically schedule the one or more later payments to be automatically deducted from an account associated with the portable financial device associated with the transaction. For example, the electronic service application can cause the merchant system 108, the transaction service provider system 102, and/or the issuer system 104 to automatically schedule, conduct and/or process sub-transactions for the one or more later payments at subsequently scheduled dates.

In some non-limiting embodiments or aspects, an electronic service application can modify the at least one transaction by automatically initiating, or causing the initiation of, a target action with respect to a customer or user associated with the at least one transaction. In some non-limiting embodiments or aspects, at least one processor may automatically credit a merchant loyalty account associated with the customer or user for a merchant loyalty program based at least partially on the at least one electronic service application. For example, the merchant system 108 may automatically credit the loyalty account associated with the customer or user with a discount, coupon, cash back, promotional item, sweepstakes, or any other incentive to the customer or user by updating a merchant loyalty database in the merchant system 108.

In some non-limiting embodiments or aspects, at least one processor may automatically enroll a customer or user associated with the at least one transaction in an incentive program based at least partially on the at least one electronic service application. The target action may include the at least one electronic service application causing merchant system 108 to communicate with transaction service provider system 102, issuer system 104, acquirer system 114, and/or service application provider system 116 to cause transaction service provider system 102, issuer system 104, acquirer system 114, and/or service application provider system 116 to automatically enroll the customer or user in at least one incentive program associated with the transaction service provider system 102, issuer system 104, acquirer system 114, and/or service application provider system 116. The incentive program may include any program that provides a benefit to the customer or user. The benefit may be provided to the customer or user contingent on past, present, or current use of their portable financial device(s). The benefit may be in the form of a discount, coupon, cash back, promotional item, sweepstakes, or any other incentive to the customer or user. The customer or user may be entered into one or multiple incentive programs. The at least one electronic service application used to conduct or process the transaction can automatically identify an incentive program(s) into which the customer or user is automatically enrolled, or allow the customer or user to select an incentive program(s) into which the customer or user is automatically enrolled via POS device 110.

In some non-limiting embodiments or aspects, automatically enrolling a customer or user in the incentive program(s) may cause a benefit to be transmitted to a user device 106 of the customer or user, such as but not limited to a voucher in an electronic wallet application. In other non-limiting embodiments or aspects, the at least one electronic service application can cause the merchant system 108, transaction service provider system 102, issuer system 104, acquirer system 114, and/or service application provider system 116 to generate and/or transmit a targeted communication to the user device 106 of the customer or user. The communication may include information regarding use of their portable financial device, including the benefits of using the portable financial device at specific merchants and/or for specific types of transactions. The communication may also include an offer to enter at least one incentive program as described above. This communication may be sent in combination with automatically enrolling the customer or user in an incentive program (e.g., a notification communication notifying the customer or user of enrollment in an incentive program). The communication may be automatically generated and sent to the user device 106 of the customer or user by the merchant system 108, transaction service provider system 102, issuer system 104, acquirer system 114, and/or service application provider system 116. The communication may take any communication form, including a web-based communication, an email communication, a text message, a telephone call, a push notification, and/or an instant message. The customer or user may respond to the communication. A targeted offer may also include any other action directed to incentivizing, educating, or encouraging a customer or user to more frequently use their portable financial device at specific merchants and/or for specific types of transactions.

With continued reference to FIG. 3, in step 310, an authorization request message may include the electronic service application data associated with the at least one electronic service application, the transaction data, the modified transaction data, or any combination thereof. The merchant system 108 can transmit an authorization request message including the modified transaction data to transaction service provider system 102, issuer system 104, acquirer system 114, and/or service application provider system 116 so that the payment transaction may be authorized, settled, and/or cleared. For example, if an electronic service application applied to the at least one transaction reduces a transaction amount of the at least one transaction, the authorization request message may include a request for authorization of a net transaction amount, e.g., an original transaction amount less a discount, such as a discount from a Groupon or other coupon, and an instruction to bill the net amount. If an electronic service application applied to the at least one transaction splits a total transaction amount of the at least one transaction into multiple installment amounts, the authorization request message may include a request for authorization of the total transaction amount and an instruction to initially bill only an initial installment amount of the multiple installments. In some non-limiting embodiments or aspects, the authorization request message may include request to schedule automatic billing of the later installment amounts on a specific date(s).

In some non-limiting embodiments or aspects, an authorization request message may include a request to enroll a customer or user associated with the at least one transaction in an incentive program associated with the merchant system 108, transaction service provider system 102, issuer system 104, acquirer system 114, and/or service application provider system 116, and/or a request that the merchant system 108, transaction service provider system 102, issuer system 104, acquirer system 114, and/or service application provider system 116 generate and/or transmit a targeted communication to the user device 106 of the customer or user, as described herein.

In some non-limiting embodiments or aspects, backend system 112 of merchant system 108 may generate the authorization request message. For example, backend system 112 may receive the modified transaction data from POS device 110 and backend system 112 may generate the authorization request message associated with the at least one modified transaction. In some non-limiting embodiments or aspects, POS device 110 of merchant system 108 may generate the authorization request message.

With continued reference to FIG. 3, in step 312, an authorization response message may include an indication that the payment transaction was successfully completed (e.g., authorized, cleared, settled, and/or the like) or not successfully completed (e.g., not authorized, not cleared, not settled, and/or the like). For example, the merchant system 108 may receive an authorization response message in response to an authorization request message. In some non-limiting embodiments, POS device 810 may display the indication that the payment transaction was successfully completed or not successfully completed. In some non-limiting embodiments or aspects, backend system 112 of merchant system 108 may receive the authorization response message. For example, backend system 112 may receive the authorization response message from transaction service provider system 102 and/or issuer system 104 and backend system 112 may transmit the authorization response message to POS device 110. In some non-limiting embodiments or aspects, POS device 110 of merchant system 108 may directly receive the authorization response message from the transaction service provider system 102 and/or issuer system 104.

Figure 4:
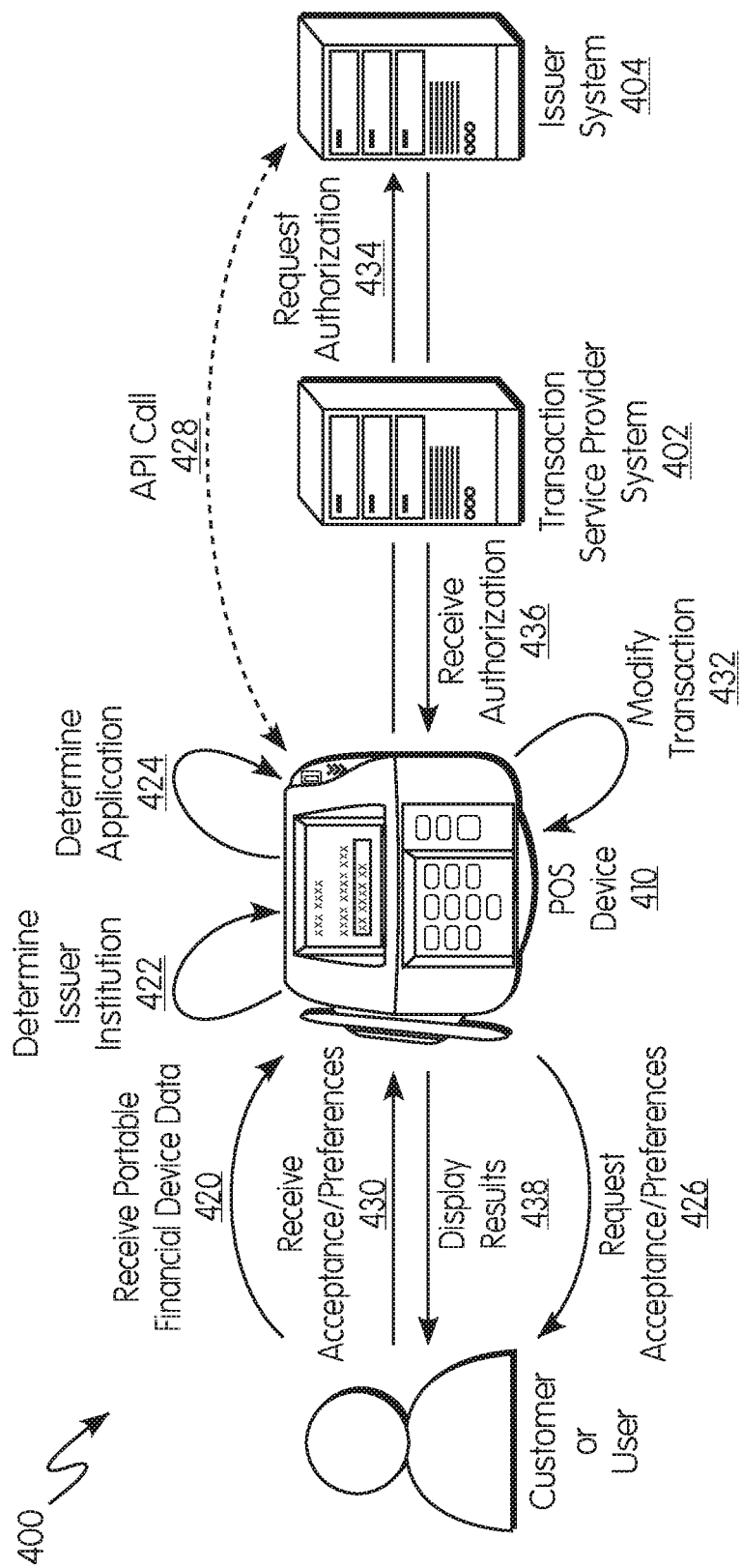
FIG. 4 is a diagram of an implementation of some non-limiting embodiments or aspects of the process shown in FIG. 3.

FIG. 4 is a diagram of an overview of some non-limiting embodiments or aspects of an implementation 400 relating to process 300 shown in FIG. 3. As shown in FIG. 4, implementation 400 may include a customer or user, a POS device 410, transaction service provider system 402, and/or issuer system 404. In some non-limiting embodiments or aspects, POS device 410 may be the same as or similar to POS device 110 as described above, transaction service provider system 402 may be the same as or similar to transaction service provider system 102 as described above, and issuer system 404 may be the same as or similar to issuer system 104 described above.

It is noted that implementation 400 is described primarily with respect to POS device 410 performing one or more functions referenced by reference numbers in FIG. 4; however, additionally, or alternatively, a remote system or server, such as backend server 112 of merchant system 108 that communicates with POS device 410, or a cloud-based server of a cloud-based POS system in which POS device 410 comprises a user device, such as a tablet computer, that communicates with the cloud-based server, may perform one or more functions referenced by the reference numbers in FIG. 4.

As shown by reference number 420 in FIG. 4, POS device 410 may receive portable financial device data including an account identifier for a portable financial device of the customer or user to conduct a payment transaction in exchange for goods or services offered by a merchant associated with the POS device 410.

As shown by reference number 422 in FIG. 4, POS device 410 determines an issuer institution associated with the portable financial device. For example, the account identifier may include a BIN that uniquely identifies the issuer institution. As shown by reference number 424, POS device 410 determines if at least one electronic service application is associated with the determined issuer institution. For example, the POS device 410 can use a look-up table to identify an electronic service application associated with the determined issuer institution. If there is no electronic service application associated with the issuer institution, the POS device 410 may proceed directly to attempting to authorize the payment transaction without modifying the payment transaction with an electronic service application.

In reference number 424, the POS device 410 may apply at least one rule to transaction data associated with the transaction. The at least one rule may define at least one of the following requirements of the transaction for the electronic service application to be determined for use in conducting or processing the transaction: transaction amount, transaction date and time, transaction or merchant location, transaction currency, transaction data category, type of portable financial device, or any combination thereof. For example, a total transaction amount greater than $1,000 may be required to use an electronic service application that converts a transaction amount of a transaction into multiple monthly installment payments in conducting or processing the transaction.

As shown in reference number 426, the POS device 410 provides an interface or prompt that requests acceptance from the customer or user to conduct or process the transaction with the determined electronic service application. For example, the POS device 410 may access or load the at least one electronic service application to prompt the customer or user to convert the transaction amount of the transaction into the multiple monthly installment payments. In some non-limiting embodiments or aspects, as shown in reference number 428, the POS device 410 provides the interface or prompt and/or receives the at least one rule by issuing at least one API call to at least one remote or external computing system associated with the at least one electronic service application, such as issuer system 404 associated with the determined issuing institution that provides the electronic service application for converting a transaction amount into multiple monthly installment payments. In some non-limiting embodiments or examples, the POS device 410 provides the interface or prompt with a request for additional information from the customer or user to configure application of the electronic service application according to one or more user preferences. For example, the POS device 410 can prompt the customer or user to choose 3, 6, or 9-month installment payments for the electronic service application for converting a transaction amount into multiple monthly installment payments.

As shown in reference number 430, the POS device 410 receives acceptance to conduct or process the transaction with the electronic service application and, if applicable, one or more user preferences, such as a selection of 3-month installment payments for an electronic service application for converting a transaction amount into multiple monthly installment payments. If the POS device 410 does not receive acceptance to conduct or process the transaction with the electronic service application, (e.g., the customer or user declines the acceptance request or a timer after sending the acceptance request times out), the POS device 410 may proceed directly to attempting to authorize the payment transaction without modifying the payment transaction with the electronic service application. However, non-limiting embodiments and aspects are not limited thereto, and application of some electronic service applications may be performed automatically by the POS device 410 without requesting and/or receiving acceptance from the customer or user.

As shown in reference number 432, in response to the acceptance/preferences shown in reference number 430, the POS device 430 modifies the transaction with the electronic service application. For example, the POS device 430 converts a transaction amount of the transaction into an initial amount and one or more subsequent amounts, such as an initial amount of $500 dollar, a first subsequent amount of 500 dollars to be billed at a date three months from the transaction date, and a second subsequent amount of $500 to be billed at a date 6 months from the transaction date.

As shown in reference number 434 the POS device 410 transmits an authorization request message including the modified transaction data and/or the electronic service application data to transaction service provider system 402 and issuer system 404 so that the payment transaction may be authorized, settled, and/or cleared. As shown in reference number 436, in response to the authorization request message as shown in reference number 434, the POS device 410 receives an authorization response message that includes an indication that the payment transaction was successfully completed (e.g., authorized, cleared, settled, and/or the like) or not successfully completed (e.g., not authorized, not cleared, not settled, and/or the like). As shown in reference number 438, POS device 410 may display the indication that the payment transaction was successfully completed or not successfully completed.

Figure 5:
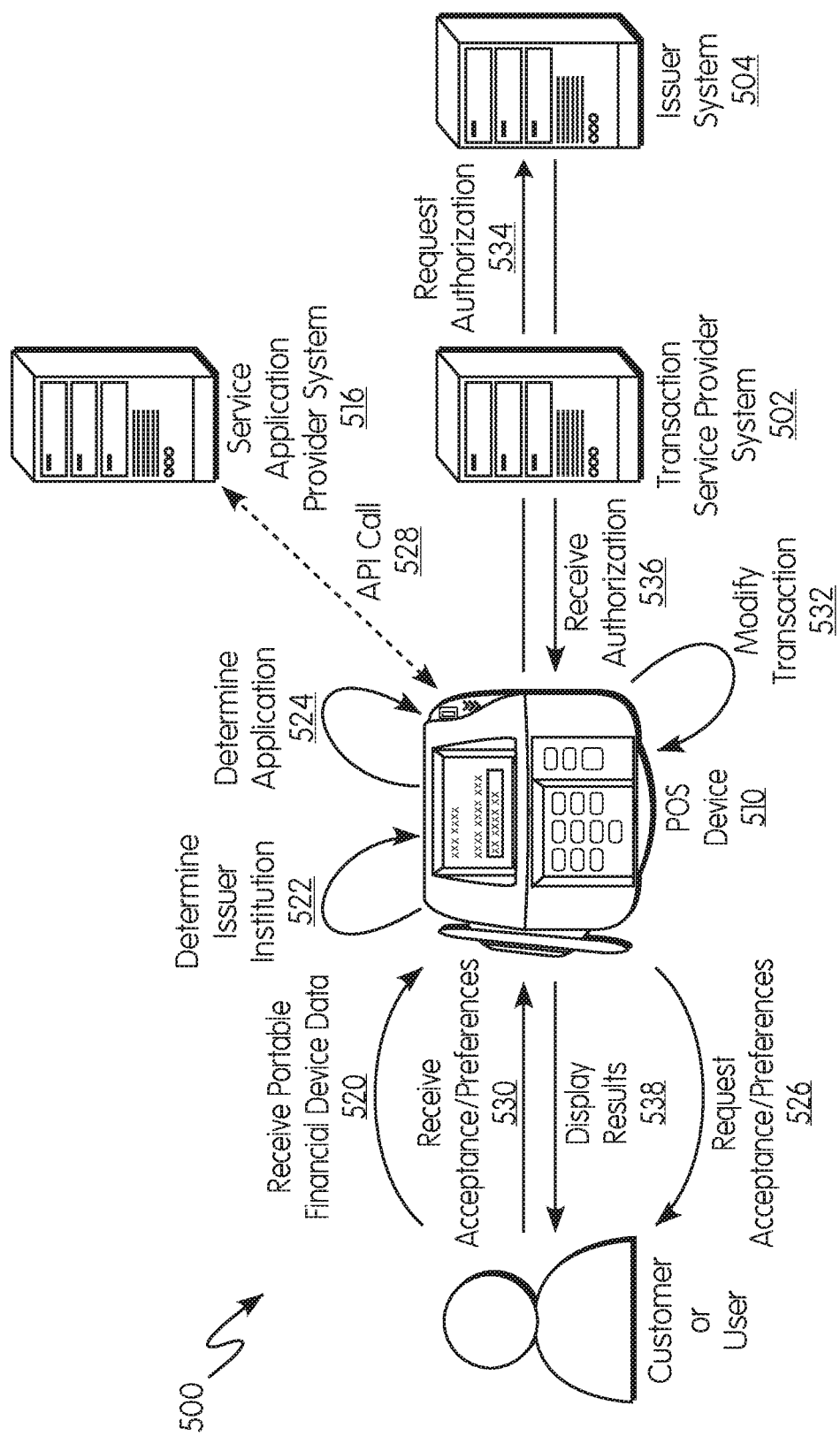
FIG. 5 is a diagram of an implementation of some non-limiting embodiments or aspects of the process shown in FIG. 3.

FIG. 5 is a diagram of an overview of some non-limiting embodiments or aspects of an implementation 500 relating to process 300 shown in FIG. 3. As shown in FIG. 5, implementation 500 may include a customer or user, a POS device 510, transaction service provider system 502, issuer system 504, and service application provider system 516. In some non-limiting embodiments or aspects, POS device 510 may be the same as or similar to POS device 110 as described above, transaction service provider system 502 may the same as or similar to transaction service provider system 102 as described above, issuer system 504 may be the same as or similar to issuer system 104 described above, and service application provider system 516 may be the same as or similar to service application provider system 116.

It is noted that implementation 500 is described primarily with respect to POS device 510 performing one or more functions referenced by reference numbers in FIG. 5; however, additionally, or alternatively, a remote system or server, such as backend server 112 of merchant system 108 that communicates with POS device 510, or a cloud-based server of a cloud-based POS system in which POS device 510 comprises a user device, such as a tablet computer, that communicates with the cloud-based server, may perform one or more functions referenced by the reference numbers in FIG. 5.

As shown by reference number 520 in FIG. 5, POS device 510 may receive portable financial device data including an account identifier for a portable financial device of the customer or user to conduct a payment transaction in exchange for goods or services offered by a merchant associated with the POS device 510.

As shown by reference number 522 in FIG. 5, POS device 510 determines an issuer institution associated with the portable financial device. For example, the account identifier may include a BIN that uniquely identifies the issuer institution. As shown by reference number 524, POS device 510 determines if at least one electronic service application is associated with the determined issuer institution. For example, the POS device 510 can query a look-up table to identify an electronic service application associated with the determined issuer institution. If there is no electronic service application associated with the issuer institution, the POS device 510 may proceed directly to attempting to authorize the payment transaction without modifying the payment transaction with an electronic service application.

In reference number 524, the POS device 510 may apply at least one rule to transaction data associated with the transaction. The at least one rule may define at least one of the following requirements of the transaction for the electronic service application to be determined for use in conducting or processing the transaction: transaction amount, transaction date and time, transaction or merchant location, transaction currency, transaction data category, type of portable financial device, or any combination thereof. For example, an electronic service application that reduces a transaction amount of a transaction, e.g., by a percentage amount, may require that the transaction include goods or services in a particular transaction data category and/or a transaction amount above a threshold transaction amount.

As shown in reference number 526, the POS device 510 provides an interface or prompt that requests acceptance from the customer or user to conduct or process the transaction with the determined electronic service application. For example, the POS device 510 may access or load the at least one electronic service application to prompt the customer or user to reduce the transaction amount of the transaction. In some non-limiting embodiments or aspects, as shown in reference number 528, the POS device 510 provides the interface or prompt and/or receives the at least one rule by issuing at least one API call to service application provider system 116 associated with the at least one electronic service application for converting a transaction amount into multiple monthly installment payments. For example, service application provider system 116 may be one or more computer systems operated by or on behalf of an e-commerce marketplace or discount provider, such as Groupon. In some non-limiting embodiments or examples, the POS device 510 provides the interface or prompt with a request for additional information from the customer or user to configure application of the electronic service application according to one or more user preferences. For example, the POS device 510 can prompt the customer or user to choose between multiple different discount options for reducing the transaction amount, or automatically select a discount option that provides a greatest discount for the customer or user.

As shown in reference number 530, the POS device 510 receives acceptance to conduct or process the transaction with the electronic service application and, if applicable, one or more user preferences, such as a selection of discount for reducing a transaction amount. If the POS device 510 does not receive acceptance to conduct or process the transaction with the electronic service application, e.g., the customer or user declines the request or a timer initiated after sending the acceptance request times out, the POS device 510 may proceed directly to attempting to authorize the payment transaction without modifying the payment transaction with the electronic service application. However, non-limiting embodiments and aspects are not limited thereto, and application of some electronic service applications may be performed automatically by the POS device 510 without requesting and/or receiving acceptance from the customer or user.

As shown in reference number 532, in response to the acceptance/preferences shown in reference number 530, the POS device 530 modifies the transaction with the electronic service application. For example, the POS device 530 reduces a transaction amount of the transaction from an initial or gross amount into a reduced or modified amount, e.g., an initial amount of $100 reduced by 30% results in a reduced or modified amount of $70 to be billed to complete the transaction.

As shown in reference number 534 the POS device 510 transmits an authorization request message including the modified transaction data and/or electronic service application data to transaction service provider system 502 and issuer system 504 so that the payment transaction may be authorized, settled, and/or cleared. As shown in reference number 536, in response to the authorization request message as shown in reference number 534, the POS device 510 receives an authorization response message that includes an indication that the payment transaction was successfully completed (e.g., authorized, cleared, settled, and/or the like) or not successfully completed (e.g., not authorized, not cleared, not settled, and/or the like). As shown in reference number 538, POS device 510 may display the indication that the payment transaction was successfully completed or not successfully completed.

Figure 6:
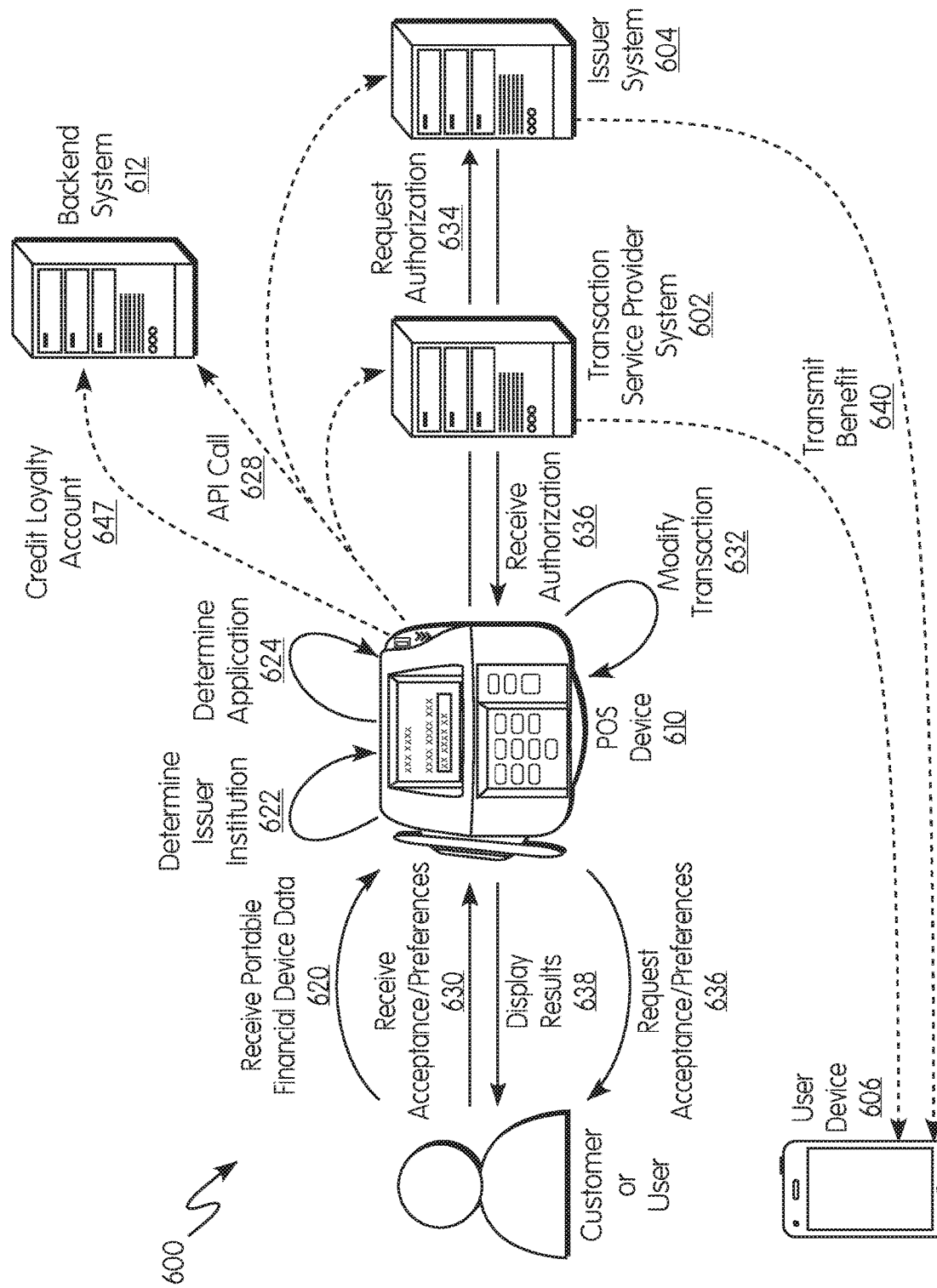
FIG. 6 is a diagram of an implementation of some non-limiting embodiments or aspects of the process shown in FIG. 3.

FIG. 6 is a diagram of an overview of some some non-limiting embodiments or aspects of an implementation 600 relating to process 300 shown in FIG. 3. As shown in FIG. 6, implementation 600 may include a customer or user, a user device 606, a POS device 610, transaction service provider system 602, issuer system 604, and backend system 612. In some non-limiting embodiments or aspects, user device 606 may be the same as or similar to user device 106 as described above, POS device 610 may be the same as or similar to POS device 110 as described above, transaction service provider system 602 may the same as or similar to transaction service provider system 102 as described above, issuer system 604 may be the same as or similar to issuer system 104 described above, service application provider system 616 may be the same as or similar to service application provider system 116 as described above, and backend system 612 may be the same as or similar to backend system 112 as described above.

It is noted that implementation 600 is described primarily with respect to POS device 610 performing one or more functions referenced by reference numbers in FIG. 6; however, additionally, or alternatively, a remote system or server, such as backend server 612 that communicates with POS device 610, or a cloud-based server of a cloud-based POS system in which POS device 610 comprises a user device, such as a tablet computer, that communicates with the cloud-based server, may perform one or more functions referenced by the reference numbers in FIG. 6.

As shown by reference numbers 620 in FIG. 6, POS device 610 may receive portable financial device data including an account identifier for a portable financial device of the customer or user to conduct a payment transaction in exchange for goods or services offered by a merchant associated with the POS device 610.

As shown by reference number 622 in FIG. 6, POS device 610 determines an issuer institution associated with the portable financial device. For example, the account identifier may include a BIN that uniquely identifies the issuer institution. As shown by reference number 624, POS device 610 determines if at least one electronic service application is associated with the determined issuer institution. For example, the POS device 610 can query a look-up table to identify an electronic service application associated with the determined issuer institution. If there is no electronic service application associated with the issuer institution, the POS device 610 may proceed directly to attempting to authorize the payment transaction without modifying the payment transaction with an electronic service application.

In reference number 624, the POS device 610 may apply at least one rule to transaction data associated with the transaction. The at least one rule may define at least one of the following requirements of the transaction for the electronic service application to be determined for use in conducting or processing the transaction: transaction amount, transaction date and time, transaction or merchant location, transaction currency, transaction data category, type of portable financial device, or any combination thereof. For example, an electronic service application that automatically enrolls the customer or user in an incentive program, automatically causes a benefit to be transmitted to user device 606 of the customer or user, or automatically credit a merchant loyalty account of the customer or user may require that the transaction occur at a specific time and/or location.

As shown in reference number 626, the POS device 610 provides an interface or prompt that requests acceptance from the customer or user to conduct or process the transaction with the determined electronic service application. For example, the POS device 610 may access or load the at least one electronic service application to prompt the customer or user to accept enrollment an incentive program, a benefit to be transmitted to user device 606 of the customer or user, and/or credit of a merchant loyalty account of the customer or user. In some non-limiting embodiments or aspects, as shown in reference number 628, the POS device 610 provides the interface or prompt and/or receives the at least one rule by issuing at least one API call to at least one remote or external computing system associated with the at least one electronic service application, such as backend system 612, transaction service provider system 602, or issuer system 604 provides the electronic service application(s) for automatically enrolling the customer or user in an incentive program, automatically causing a benefit to be transmitted to user device 606 of the customer or user, or automatically crediting a merchant loyalty account of the customer or user. In some non-limiting embodiments or examples, the POS device 610 provides the interface or prompt with a request for additional information from the customer or user to configure application the electronic service application according to one or more user preferences. For example, the POS device 610 can prompt the customer or user to select a specific incentive program(s), reward(s), and/or benefit(s) for the electronic service application.

As shown in reference number 630, the POS device 610 receives acceptance to conduct or process the transaction with the electronic service application and, if applicable, one or more user preferences, such as a selection of a specific incentive program or reward. If the POS device 610 does not receive acceptance to conduct or process the transaction with the electronic service application, e.g., the customer or user declines the request or a timer initiated after sending the acceptance request times out, the POS device 610 may proceed directly to attempting to authorize the payment transaction without modifying the payment transaction with the electronic service application. However, non-limiting embodiments and aspects are not limited thereto, and application of some electronic service applications may be performed automatically by the POS device 610 without requesting and/or receiving acceptance from the customer or user.

As shown in reference number 632, in response to the acceptance/preferences shown in reference number 630, the POS device 630 modifies the transaction data associated with the transaction to include at least one of the following: an instruction to automatically enroll the customer or user in an incentive program(s), an instruction to automatically cause a benefit to be transmitted to user device 606 of the customer or user, or an instruction to automatically credit a merchant loyalty account of the customer or user. For example, the POS device 620 may modify the transaction data to include an instruction to the backend system 612 to automatically credit a merchant loyalty account of the customer or user. The POS device may modify the transaction data to include an instruction to the transaction provider system 602 and/or the issuer system 604 to automatically enroll the customer or user in an incentive program(s) associated with the transaction service provider and/or the issuing institution and/or to automatically transmit a benefit to user device 606 of the customer or user.

As shown in reference number 634 the POS device 610 transmits an authorization message request including the modified transaction data to transaction service provider system 502 and issuer system 504 so that the payment transaction may be authorized, settled, and/or cleared. As shown in reference number 636, in response to the authorization request message as shown in reference number 634, the POS device 610 receives an authorization response message that includes an indication that the payment transaction was successfully completed (e.g., authorized, cleared, settled, and/or the like) or not successfully completed (e.g., not authorized, not cleared, not settled, and/or the like) and, if applicable, an indication that the customer or user was enrolled in the incentive program(s). As shown in reference number 638, POS device 610 may display the indication that the payment transaction was successfully completed or not successfully completed and/or the indication that the customer or user was enrolled in the incentive program.

As shown in reference number 640, user device 606 may receive a benefit transmitted from the transaction service provider system 602 and/or the issuer instruction 604 as a result of the electronic service application being applied to the transaction, as described herein. As shown in reference number 642, the POS device 610 may transmit an instruction to the backend system 612 to credit the merchant loyalty account associated with the customer or user in response to completion of the transaction.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for dynamic application selection for payment transactions, the method comprising:

determining, with at least one processor of a point-of-sale (POS) device, identification data of an issuer institution associated with a portable financial device based at least partially on transaction data associated with at least one transaction at a merchant with the portable financial device;

determining, with the at least one processor of the POS device, at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant, and wherein the plurality of electronic service application data comprises Application Programming Interface (API) information associated with the plurality of electronic service applications;

initiating, with the at least one processor of the POS device, at least one API call to at least one external computing system associated with the at least one electronic service application to access the at least one electronic service application at the at least one external computing system, wherein the at least one external computing system includes an issuer system associated with the issuer institution, and wherein the POS device makes the at least one API call directly to the issuer system;

providing, with the at least one processor of the POS device, via a display of the POS device, a graphical user interface including a prompt to divide the transaction amount of the at least one transaction into a plurality of installment amounts by accessing, with the at least one processor of the POS device, the at least one electronic service application at the at least one external computing system;

receiving, with the at least one processor of the POS device, an acceptance of the prompt to divide the transaction amount of the at least one transaction into a plurality of installment amounts;

modifying, with the at least one processor of the POS device, using the at least one electronic service application at the at least one external computing system, the at least one transaction by (i) dividing the transaction amount of the at least one transaction into a plurality of installment amounts including an initial amount to be deducted from an account associated with the portable financial device upon authorization of the at least one transaction and one or more subsequent amounts and (ii) automatically scheduling one or more sub-transactions at one or more later dates from the transaction date for the one or more subsequent amounts to be deducted from the account associated with the portable financial device;

communicating, with the at least one processor of the POS device, to the issuer system via a transaction service provider system, an authorization request message associated with the at least one modified transaction, wherein the authorization request message includes electronic service application data associated with the electronic service application that causes the issuer system to automatically process the one or more sub-transactions for the one or more subsequent amounts at the one or more later dates; and receiving, with the at least one processor of the POS device, an authorization response message after communicating the authorization request message.

2. The computer-implemented method of claim 1, further comprising:
receiving, with the at least one processor of the POS device, via the display of the POS device, acceptance data that indicates acceptance of the at least one electronic service application before initiating the at least one API call.

3. The computer-implemented method of claim 1, wherein the plurality of electronic service application data is stored on at least one of the following: the POS device, a backend system of the merchant system, or any combination thereof.

4. The computer-implemented method of claim 1, wherein the issuer institution is associated with two or more electronic service applications of the plurality of electronic service applications, the method further comprising:
based at least partially on the identification data of the issuer institution, determining, with the at least one processor of the POS device, a subset of the two or more electronic service applications as the at least one electronic service application.

5. The computer-implemented method of claim 1, further comprising:
determining, with the at least one processor of the POS device, the at least one electronic service application based at least partially on at least one of the following: a transaction amount of the at least one transaction, a transaction date and/or time of the at least one transaction, a location of the at least one transaction or merchant, a currency of the at least one transaction, a transaction data category of the at least one transaction, a type of the portable financial device, or any combination thereof.

6. The computer-implemented method of claim 1, further comprising:
receiving, with the at least one processor of the POS device, the transaction data associated with the at least one transaction, wherein the transaction data comprises portable financial device data associated with the portable financial device, and wherein the portable financial device data comprises an account identifier.

7. The computer-implemented method of claim 1, wherein the identification data of the issuer institution comprises at least one of the following: a Bank Identification Number (BIN), a range of BINs, an Issuer Identification Number (IIN), a range of IINs, or any combination thereof.

8. A system for dynamic application selection for payment transactions, comprising at least one processor of a point-of-sale (POS) device, wherein the at least one processor of the POS device is programmed and/or configured to:
determine identification data of an issuer institution associated with a portable financial device based at least partially on transaction data associated with at least one transaction at a merchant with the portable financial device;
determine at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant, and wherein the plurality of electronic service application data comprises Application Programming Interface (API) information associated with the plurality of electronic service applications;
initiate at least one API call to at least one external computing system associated with the at least one electronic service application to access the at least one electronic service application at the at least one external computing system, wherein the at least one external computing system includes an issuer system associated with the issuer institution, and wherein the POS device makes the at least one API call directly to the issuer system;
provide, via a display of the POS device, a graphical user interface including a prompt to divide the transaction amount of the at least one transaction into a plurality of installment amounts by accessing, with the at least one processor of the POS device, the at least one electronic service application at the at least one external computing system;
receive an acceptance of the prompt to divide the transaction amount of the at least one transaction into a plurality of installment amounts;
modify, using the at least one electronic service application at the at least one external computing system, the at least one transaction by (i) dividing the transaction amount of the at least one transaction into a plurality of installment amounts including an initial amount to be deducted from an account associated with the portable financial device upon authorization of the at least one transaction and one or more subsequent amounts and (ii) automatically scheduling one or more sub-transactions at one or more later dates from the transaction date for the one or more subsequent amounts to be deducted from the account associated with the portable financial device;
communicate, to the issuer system via a transaction service provider system, an authorization request message associated with the at least one modified transaction, wherein the authorization request message includes electronic service application data associated with the electronic service application that causes the issuer system to automatically process the one or more sub-transactions for the one or more subsequent amounts at the one or more later dates; and
receive an authorization response message after communicating the authorization request message.

9. The system of claim 8, wherein the at least one processor of the POS device is further programed and/or configured to:
receive, via the display of the POS device, acceptance data that indicates acceptance of the at least one electronic service application before initiating the at least one API call.

10. The system of claim 8, wherein the plurality of electronic service application data is stored on at least one of the following: the POS device, a backend system of the merchant, or any combination thereof.

11. The system of claim 8, wherein the issuer institution is associated with two or more electronic service applications of the plurality of electronic service applications, and wherein the at least one processor of the POS device is further programmed and/or configured to determine a subset of the two or more electronic service applications as the at least one electronic service application based at least partially on the identification data of the issuer institution.

12. The system of claim 8, wherein the at least one processor of the POS device is further programmed and/or configured to determine the at least one electronic service application based at least partially on at least one of the following: a transaction amount of the at least one transaction, a transaction date and/or time of the at least one transaction, a location of the at least one transaction or merchant, a currency of the at least one transaction, a transaction data category of the at least one transaction, a type of the portable financial device, or any combination thereof.

13. The system of claim 8, wherein the at least one processor of the POS device is further programmed and/or configured to receive the transaction data associated with the at least one transaction, wherein the transaction data comprises portable financial device data associated with a customer, and wherein the portable financial device data comprises an account identifier.

14. The system of claim 8, wherein the identification data of the issuer institution comprises at least one of the following: a Bank Identification Number (BIN), a range of BINs, an Issuer Identification Number (IIN), a range of IINs, or any combination thereof.

15. The system of claim 8, wherein the POS device comprises a cloud-based POS system.

16. A computer program product for dynamic application selection for payment transactions, the computer program product comprising at least one non-transitory computer-readable medium including program instructions that, when executed by at least one processor of a point-of-sale (POS) device cause the at least one processor of the POS device to:
    determine identification data of an issuer institution associated with a portable financial device based at least partially on transaction data associated with at least one transaction at a merchant with the portable financial device;
    determine at least one electronic service application of a plurality of electronic service applications based at least partially on the identification data of the issuer institution, wherein a plurality of electronic service application data associated with the plurality of electronic service applications is stored in association with a plurality of issuing institutions at a merchant system of the merchant, and wherein the plurality of electronic service application data comprises Application Programming Interface (API) information associated with the plurality of electronic service applications;
    initiate at least one API call to at least one external computing system associated with the at least one electronic service application to access the at least one electronic service application at the at least one external computing system, wherein the at least one external computing system includes an issuer system associated with the issuer institution, and wherein the POS device makes the at least one API call directly to the issuer system;
    provide, via a display of the POS device, a graphical user interface including a prompt to divide the transaction amount of the at least one transaction into a plurality of installment amounts by accessing, with the at least one processor of the POS device, the at least one electronic service application at the at least one external computing system;
    receive an acceptance of the prompt to divide the transaction amount of the at least one transaction into a plurality of installment amounts;
    modify, using the at least one electronic service application at the at least one external computing system, the at least one transaction by (i) dividing the transaction amount of the at least one transaction into a plurality of installment amounts including an initial amount to be deducted from an account associated with the portable financial device upon authorization of the at least one transaction and one or more subsequent amounts and (ii) automatically scheduling one or more sub-transactions at one or more later dates from the transaction date for the one or more subsequent amounts to be deducted from the account associated with the portable financial device;
    communicate, to the issuer system via a transaction service provider system, an authorization request message associated with the at least one modified transaction, wherein the authorization request message includes electronic service application data associated with the electronic service application that causes the issuer system to automatically process the one or more sub-transactions for the one or more subsequent amounts at the one or more later dates; and
    receive an authorization response message after communicating the authorization request message.

\* \* \* \* \*